United States Patent [19]

Bessler

[11] Patent Number: 5,586,445
[45] Date of Patent: Dec. 24, 1996

[54] LOW REFRIGERANT CHARGE DETECTION USING A COMBINED PRESSURE/TEMPERATURE SENSOR

[75] Inventor: Warren F. Bessler, Schenectady, N.Y.

[73] Assignee: General Electric Company, Schenectady, N.Y.

[21] Appl. No.: 315,804

[22] Filed: Sep. 30, 1994

[51] Int. Cl.⁶ .................................................... F25B 49/02
[52] U.S. Cl. .................................................. 62/126; 62/129
[58] Field of Search ............................ 62/126, 129, 127, 62/208, 209, 203, 214

[56] References Cited

U.S. PATENT DOCUMENTS

| | | | |
|---|---|---|---|
| 3,698,204 | 10/1972 | Schlotterbeck et al. | 62/206 |
| 4,167,858 | 9/1979 | Kojima et al. | 62/126 |
| 4,651,535 | 3/1987 | Alsenz | 62/225 |
| 4,653,288 | 3/1987 | Sayo et al. | 62/210 |
| 4,677,830 | 7/1987 | Sumikawa et al. | 62/126 |
| 4,745,767 | 5/1988 | Ohya et al. | 62/211 |
| 5,070,706 | 12/1991 | Waters et al. | 62/129 |
| 5,301,514 | 4/1994 | Bessler | 62/126 |
| 5,381,669 | 1/1995 | Bahel et al. | 62/129 |
| 5,457,965 | 10/1995 | Blair et al. | 62/129 |

Primary Examiner—Harry B. Tanner
Attorney, Agent, or Firm—Patrick K. Patnode; Donald S. Ingraham

[57] ABSTRACT

Low refrigerant charge in a refrigeration system is detected by monitoring the compressor discharge pressure and temperature. This monitoring is accomplished with a combined pressure/temperature sensor located at or near the compressor outlet. The sensor output signals are fed to a controller which produces a low charge signal whenever a combination of high discharge temperature and a low discharge pressure is detected. The controller can optionally receive input of additional operating characteristics of the refrigeration system to provide a more accurate low charge signal. The controller is connected to an indicator and/or the compressor so that the low charge signal activates the indicator and/or deactivates the compressor.

10 Claims, 2 Drawing Sheets

LOW REFRIGERANT CHARGE DETECTION USING A COMBINED PRESSURE/TEMPERATURE SENSOR

BACKGROUND OF THE INVENTION

This invention relates generally to detecting low refrigerant charge in refrigeration systems, and more particularly concerns monitoring compressor discharge pressure and temperature to determine when a low charge condition exists. As used herein, the term "refrigeration system" refers to refrigerators, air conditioners or any other system which produces a refrigeration effect. However, the present invention is most applicable to air conditioning systems for automobiles.

In typical automotive air conditioning systems, refrigerant tends to leak through hose permeation and the rotating compressor shaft seal. Refrigerant leakage causes many problems. First, the release of refrigerants into the environment is believed to cause environmental damage. Second, when the refrigerant charge becomes insufficient, the reliability and cooling performance of the system suffer. Thus, a refrigeration system with a low charge is inefficient and wasteful of energy. Furthermore, low charge causes increased compressor operating temperatures while lowering mass flow rate. Reduced mass flow rate can result in insufficient flow of lubricating oil to the compressor. The lack of oil combined with high temperatures eventually causes compressor failure. Thus, there is much interest in developing means for detecting low charges.

There are a number of known ways to detect low charge, but many of these present certain disadvantages. For instance, determining low charge by measuring refrigerant inventory will not always be accurate because the optimum inventory level varies in accordance with many variables such as compressor speed, ambient and interior temperatures, blower speed, and component volumes. Other systems employ a low pressure cut-off switch which deactivates the compressor when system pressure falls below a predetermined threshold. However, since system pressures fluctuate greatly during proper operation (25–46 psi is typical), the predetermined threshold pressure must be set very low, such as 10–20 psi. As a result, the low pressure cut-off switch is effective to indicate only a severe loss of charge resulting from a ruptured hose or complete shaft seal failure. This switch will not detect marginal low charge conditions.

One way of detecting low charge which avoids the above problems is to measure the superheat at the evaporator exit. Superheat is the amount of temperature above the saturation temperature of the refrigerant. For air conditioning systems under thermal expansion valve control, the evaporator exit exhibits a small amount of superheat (typically 0°–10° F.), but if the system charge drops below a sufficient level, excess evaporator exit superheat will develop. It is well known to use excessive evaporator exit superheat as an indication of insufficient charge. For instance, U.S. Pat. No. 4,677,830 to Seiji Sumikawa et al. discloses providing a pressure sensor and a temperature sensor near the evaporator exit. An electronic control unit converts the measured pressure to a corresponding saturation temperature of the refrigerant. The difference between the measured temperature and the corresponding saturation temperature (i.e., the superheat) is then compared to a predetermined reference value to determine whether there is a sufficient quantity of refrigerant. If an insufficient charge is detected, the compressor is rendered inoperative by a signal from the electronic control unit.

In such superheat-based low charge detectors, evaporator exit superheat cannot be measured by simply sensing evaporator exit temperature. Instead, another parameter, usually system pressure or evaporator inlet temperature, must also be sensed so that the evaporator exit superheat can be mathematically derived from the evaporator exit temperature. This requires additional sensing equipment which adds cost to the detection system. Furthermore, a high degree of evaporator exit superheat can exist even with a full charge under some conditions. For example, during startup or rapid acceleration, the expansion valve does not open fast enough to control the sudden increase in the compressor flow rate and excess evaporator exit superheat develops. Therefore, excessive superheat at the evaporator exit is not always an indication of low charge in air conditioning systems under thermal expansion valve control. Thus, direct measurement of evaporator exit superheat will sometimes produce false indications of low charge.

Accordingly, there is a need for detecting marginal low charge conditions without directly measuring superheat.

SUMMARY OF THE INVENTION

The above-mentioned needs are met by the present invention which provides a refrigeration system with a means for monitoring the compressor discharge pressure and temperature. More particularly, this includes a combined pressure/temperature sensor located near the discharge of the compressor. A controller is provided for monitoring the sensor output signals, and the controller produces a low charge signal whenever a combination of high discharge temperature and a low discharge pressure is detected. The controller can optionally receive input of additional operating characteristics of the refrigeration system to provide a more accurate low charge signal. The controller is connected to an indicator and/or the compressor so that the low charge signal activates the indicator and/or deactivates the compressor.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
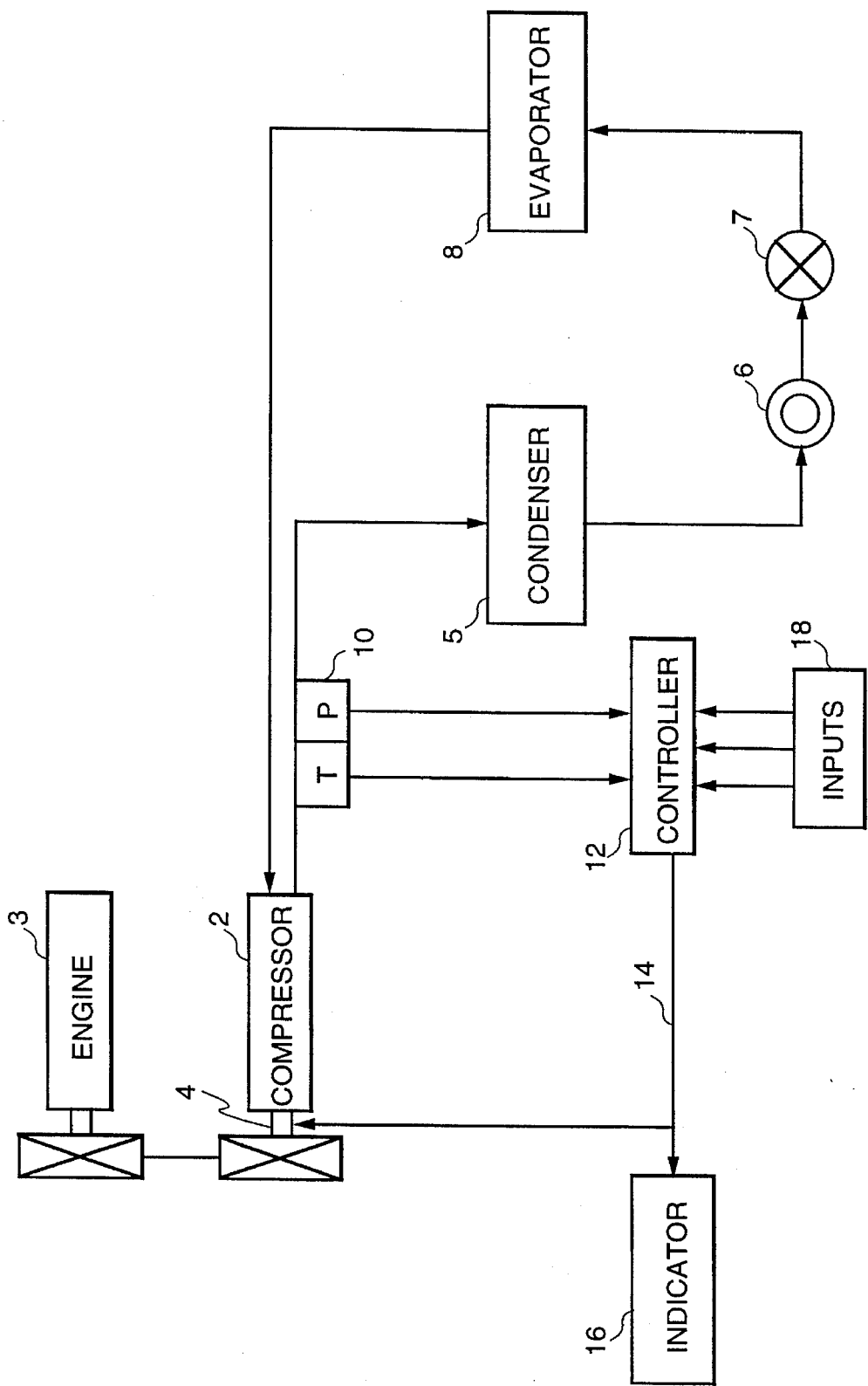
FIG. 1 is a schematic diagram of a refrigeration system having low charge detection in accordance with the present invention.

Referring to the drawing wherein the same reference numerals are used to identify the same elements throughout the several views, FIG. 1 shows a refrigeration system in which the low refrigerant charge detection of the present invention can be used. The refrigeration system, which will typically be an automotive air conditioning system, includes a compressor 2 which is selectively driven by an engine 3 through a clutch 4, with refrigerant being compressed by the compressor 2 to high temperature and pressure. The refrigerant is then condensed by a condenser 5 where it loses heat to the ambient. The refrigerant is then directed to a receiver 6 which passes only liquid refrigerant, thereby separating any vaporous refrigerant which may not have been fully condensed by the condenser 5. The liquid refrigerant flows through an expansion device 7 such as a thermal expansion valve or an orifice tube so that it undergoes adiabatic expansion. The now low pressure (i.e., saturation pressure) refrigerant flows through an evaporator 8 where it is vaporized through the absorption of heat around the evaporator 8. The gaseous refrigerant exiting the evaporator 8 is returned to the compressor 2 to repeat the cycle.

The present invention includes a combined pressure/temperature sensor 10 which is located at or near the discharge of the compressor 2 so as to produce an output signal corresponding to the compressor discharge pressure and another output signal corresponding to the compressor discharge temperature. The combined pressure/temperature sensor 10 includes a pressure transducer which has a very rapid response to pressure changes. The pressure transducer is preferably a strain gage although other pressure transducers such as capacitance probes could be used. The sensor 10 also includes a temperature transducer which is preferably a thermistor, although any device which produces an appropriate temperature signal and responds fast enough to sense the temperature oscillations could be used.

The discharge pressure and temperature signals from the combined pressure/temperature sensor 10 are fed to a controller 12. The controller 12 can be incorporated in the engine computer of the automobile or can be packaged with the sensor 10 to form a so-called "smart sensor." The controller 12 monitors the discharge pressure and temperature to determine whether a low charge condition exists. Under low charge conditions, the compressor 2 does not receive adequate lubrication and is thus subject to high suction gas superheat which drives up the discharge temperature. The lack of sufficient refrigerant charge also reduces cooling capacity and compressor load from the reduction of inlet suction gas density. Thus, a combination of high discharge temperature and low discharge pressure will be indicative of low charge and the controller 12 will emit a low charge signal 14 which can be fed to an indicator 16 and/or the clutch 4. As long as the combination of high discharge temperature and low discharge pressure does not exist, then the refrigeration system is presumed to be operating at full charge and the low charge signal 14 will not be generated.

If fed to the indicator 16, the low charge signal 14 activates the indicator 16 (which is typically a light located on the automobile dashboard) to provide an indication of low charge. If fed to the compressor clutch 4, the low charge signal 14 will cause the compressor 2 to be deactivated, thereby shutting down the refrigeration system in response to a low charge condition.

Figure 2:
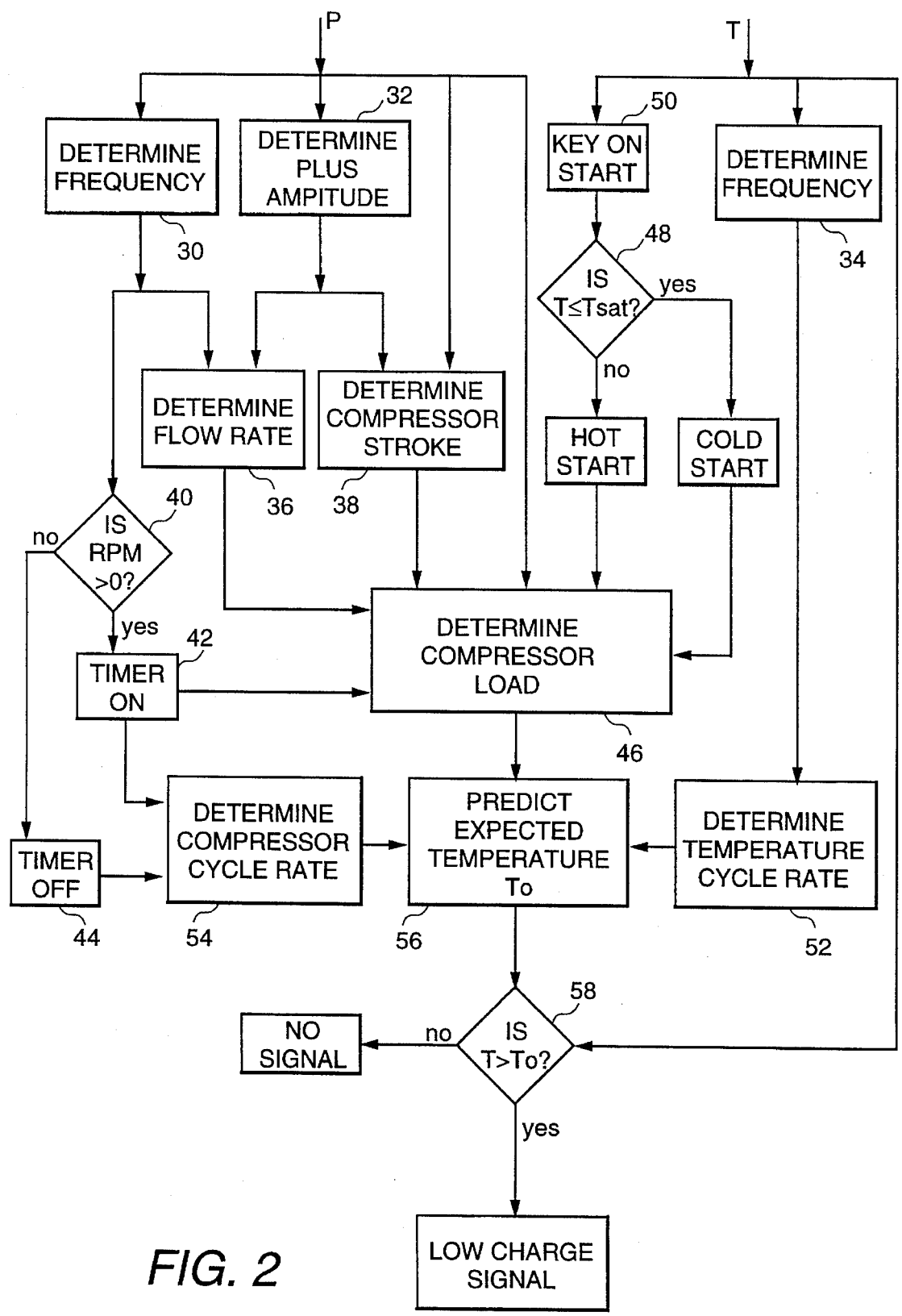
FIG. 2 is a block diagram illustrating how the present invention determines a low charge condition.

FIG. 2 shows how the compressor discharge pressure and temperature signals are used to determine low charge. The frequency and pulse amplitude of the discharge pressure signal are determined at blocks 30 and 32, respectively, and the frequency of the discharge temperature signal is determined at block 34. The frequency and pulse amplitude of the discharge pressure signal are used to determine refrigerant flow rate at block 36, and the pulse amplitude of the discharge pressure signal and the mean discharge pressure signal are used to determine the compressor stroke at block 38. The frequency of the discharge pressure signal is analyzed at block 40 to determine whether or not the compressor is operating. If the compressor is on, a timer is activated as shown at block 42. If the compressor is not on, the timer is turned off as shown at block 44.

At block 46, the output of the timer, the refrigerant flow rate, the compressor stroke, and the mean discharge pressure signal are all used to compute the compressor load. Furthermore, compressor load can be dependent on how much time has elapsed from system start up. Thus, the discharge temperature signal is used at block 48 to determine system start up status (i.e., hot or cold start) at "key on" as dictated by block 50. Information on the system start up status is useful in determining compressor load at block 46. The frequency of the discharge temperature signal determined at block 34 is used to determine the temperature cycle rate as shown at block 52, and the on/off time of the timer from blocks 42 and 44 is used to determine the compressor cycle rate as shown at block 54.

The compressor load, temperature cycle rate, and compressor cycle rate are all used to predict an expected compressor discharge temperature $T_o$ at block 56. Generally, a high compressor load at block 46 would mean a relatively high discharge temperature would be expected. A moderate discharge temperature cycle rate at block 52 indicates the refrigeration system is operating normally and a high discharge temperature would not be expected. But if the temperature cycle rate at block 52 was zero or very low, then this would indicate that the compressor was working very hard and the discharge temperature would be expected to be high. Likewise, a moderate compressor cycle rate at block 54 indicates that a high discharge temperature would not be expected, and a negligible compressor cycle rate would indicate a high expected discharge temperature. Once the expected discharge temperature $T_o$ is determined at block 56, this value is compared to the actual compressor discharge temperature T at block 58. If the actual temperature T exceeds the expected discharge temperature $T_o$, then the low charge signal is generated. The low charge signal is not generated if the actual temperature T does not exceeds the expected discharge temperature $T_o$.

The degree of accuracy in predicting the expected discharge temperature $T_o$ can be improved if additional information is available to the decision making process of block 56. Thus, a number of additional operating characteristics (indicated by reference numeral 18 in FIG. 1) of the refrigeration system and/or the automobile where the refrigeration system is an automotive air conditioner can be optionally inputted to the controller 12 for use in the expected discharge temperature $T_o$ prediction of block 56. Many additional operating characteristics, can be used. For automotive air conditioning systems, these include, but are not limited to, the ambient temperature, the interior temperature of the vehicle, the blower speed, the engine RPM, the vehicle speed, the coolant temperature, and the evaporator plate temperature. Many vehicles currently being manufactured have most or all of these characteristics already inputted into an onboard engine computer to control other aspects of the vehicle's performance. Thus, monitoring these characteristics for the purpose of accurate low charge detection does not require major modifications.

Each of these characteristics can have an affect on the accuracy of a low charge signal. Regarding the ambient temperature, if it is very high, then the air conditioning system will likely be operating under a high load. Thus, extremely high ambient temperatures indicate a high expected discharge temperature $T_o$ while moderate and low ambient temperatures indicate a low expected discharge temperature $T_o$. The vehicle interior temperature is the same; high interior temperatures indicate a likelihood of high system load and hence a high expected discharge temperature $T_o$ while moderate and low interior temperatures indicate a low expected discharge temperature $T_o$. A high blower speed is also indicative of a high load on the system. Thus, a high blower speed would tend to suggest a high expected discharge temperature $T_o$ while lower blower speeds suggest a low expected discharge temperature $T_o$. A high engine RPM, such as during rapid acceleration, means that a large amount of refrigerant is being pushed through the system. Accordingly, high engine RPM suggests a high expected discharge temperature $T_o$ and low engine RPM suggests a low expected discharge temperature $T_o$. Similarly, high vehicle speed would indicate a high expected discharge temperature $T_o$. In addition, very low vehicle speed means there is little air flow over the condenser leading to higher temperatures. Thus, very low vehicle speed also suggests a high expected discharge temperature $T_o$. However, normal vehicle speeds would indicate a lower expected discharge temperature $T_o$. The coolant temperature would also suggest a high expected discharge temperature $T_o$ at extreme low and high levels while moderate coolant temperatures would suggest a low expected discharge temperature $T_o$. For the evaporator plate temperature, high levels would indicate a high expected discharge temperature $T_o$, and low levels would indicate a low expected discharge temperature $T_o$.

The foregoing has described the detection of marginal low charge conditions by monitoring the pressure and temperature at the outlet of the compressor. While specific embodiments of the present invention have been described, it will be apparent to those skilled in the art that various modifications thereto can be made without departing from the spirit and scope of the invention as defined in the appended claims.

What is claimed is:

1. A low refrigerant charge detecting system for a refrigeration system having a compressor, said low refrigerant charge detecting system comprising:

a combined pressure and temperature sensor located near the discharge of said compressor; and a controller coupled to said combined pressure and temperature sensor wherein said controller produces a low charge signal in response to a high discharge temperature and a low discharge pressure is detected by said pressure and temperature sensor from said compressor.

2. The low refrigerant charge detecting system of claim 1 wherein said controller is coupled to said compressor so that said low charge signal deactivates said compressor.

3. The low refrigerant charge detecting system of claim 1 further comprising an indicator coupled to said controller so that said low charge signal activates said indicator.

4. The low refrigerant charge detecting system of claim 1 wherein said controller receives input of additional operating characteristics of the refrigeration system.

5. A method for detecting low refrigerant charge in a refrigeration system having a compressor, said method comprising the steps of:

monitoring the discharge temperature and the discharge pressure of said compressor; and producing a low charge signal whenever there is a high discharge temperature and a low discharge pressure.

6. The method of claim 5 wherein said low charge signal deactivates said compressor.

7. The method of claim 5 wherein said low charge signal activates an indicator.

8. The method of claim 5 further comprising the step of monitoring additional operating characteristics of the refrigeration system.

9. A method for detecting low refrigerant charge in a refrigeration system having a compressor, said method comprising the steps of:

monitoring the discharge temperature and the discharge pressure of said compressor;

determining compressor load, compressor cycle rate and temperature cycle rate from said compressor discharge temperature and said compressor discharge pressure;

predicting an expected compressor discharge temperature from said compressor load, compressor cycle rate and temperature cycle rate; and producing a low charge signal whenever the actual compressor discharge temperature exceeds said expected compressor discharge temperature.

10. The method of claim 9 further comprising the step of monitoring additional operating characteristics of the refrigeration system.

* * * * *